United States Patent
Klein

(10) Patent No.: US 10,522,990 B1
(45) Date of Patent: Dec. 31, 2019

(54) SYSTEM AND METHOD FOR AN UNDER FLOOR SEAT-TO-SEAT WIRING TROUGH TO FACILITATE FLAT FLOORS IN AIRCRAFT PASSENGER CABIN

(71) Applicant: THE BOEING COMPANY, Chicago, IL (US)

(72) Inventor: Aaron Andrew Klein, Mount Vernon, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/116,182

(22) Filed: Aug. 29, 2018

(51) Int. Cl.
- *H02G 3/00* (2006.01)
- *B64D 47/00* (2006.01)
- *H01B 7/00* (2006.01)
- *B64C 1/18* (2006.01)

(52) U.S. Cl.
CPC .............. *H02G 3/263* (2013.01); *B64C 1/18* (2013.01); *B64D 47/00* (2013.01); *H01B 7/0045* (2013.01); *B64D 2221/00* (2013.01)

(58) Field of Classification Search
CPC combination set(s) only.
See application file for complete search history.

(56) References Cited

U.S. PATENT DOCUMENTS

| | | | |
|---|---|---|---|
| 2,939,513 A * | 6/1960 | Leslie | B60N 2/0232 248/394 |
| 3,029,964 A | 4/1962 | Hudson et al. | |
| 3,318,476 A | 5/1967 | Clark | |
| 5,048,886 A * | 9/1991 | Ito | B60N 2/0232 248/430 |
| 5,060,114 A * | 10/1991 | Feinberg | H01L 23/433 165/185 |
| 5,111,627 A | 5/1992 | Brown | |
| 5,477,649 A | 12/1995 | Bessert | |
| 5,483,853 A * | 1/1996 | Moradell | B60N 2/0228 74/665 GD |
| 5,668,357 A * | 9/1997 | Takiguchi | B60N 2/0228 200/302.1 |
| 5,950,978 A * | 9/1999 | Eguchi | B60N 2/067 248/429 |
| 6,011,318 A * | 1/2000 | Mayoras | B60N 2/0224 248/424 |
| 6,429,544 B1 * | 8/2002 | Sasaki | B60N 2/0224 307/10.1 |
| 6,527,566 B1 * | 3/2003 | Lambiaso | H02G 11/00 439/131 |
| 7,191,981 B2 * | 3/2007 | Laib | B64D 11/0696 244/118.6 |

(Continued)

FOREIGN PATENT DOCUMENTS

| | | | | |
|---|---|---|---|---|
| JP | 10112922 A | * | 4/1998 | |
| JP | 2005059745 A | * | 3/2005 | ........... B60N 2/0224 |

*Primary Examiner* — William H. Mayo, III
*Assistant Examiner* — Krystal Robinson
(74) *Attorney, Agent, or Firm* — Armstrong Teasdale LLP

(57) ABSTRACT

A seat-to-seat wiring system for an aircraft includes a floor panel and a wiring trough attached to the floor panel. The wiring trough includes a housing defining a raceway for receiving a wire and a first support member coupled to the housing. The first support member is attached to the floor panel is for securing the housing to the floor panel. The housing and the wire are disposed below the floor panel.

19 Claims, 7 Drawing Sheets

(56) References Cited

U.S. PATENT DOCUMENTS

| | | | | |
|---|---|---|---|---|
| 7,265,984 B2* | 9/2007 | Numata | ............... | H05K 7/2049 |
| | | | | 165/104.33 |
| 7,503,522 B2* | 3/2009 | Henley | ................. | B64D 11/06 |
| | | | | 244/118.5 |
| 8,353,561 B2* | 1/2013 | Yamazaki | ............ | B60N 2/6009 |
| | | | | 297/452.38 |
| 8,686,286 B2* | 4/2014 | Sekino | ................ | B60R 16/0215 |
| | | | | 174/50 |
| 9,401,591 B2* | 7/2016 | Satou | ....................... | B60N 2/06 |
| 9,573,536 B2* | 2/2017 | Katou | ....................... | B60N 2/06 |
| 9,907,208 B2* | 2/2018 | Bose | ................... | H01L 23/4093 |
| 10,038,314 B2* | 7/2018 | Satou | ................... | B60R 16/0215 |
| 2001/0010424 A1* | 8/2001 | Osmer | ............... | G01G 19/4142 |
| | | | | 280/735 |
| 2002/0050730 A1* | 5/2002 | Kondo | ................... | B60N 2/002 |
| | | | | 297/217.3 |
| 2002/0144835 A1* | 10/2002 | Samhammer | ........ | H02G 3/0418 |
| | | | | 174/72 A |
| 2005/0035622 A1* | 2/2005 | Tsubaki | ............... | B60N 2/0224 |
| | | | | 296/65.13 |
| 2006/0176672 A1* | 8/2006 | Kamemoto | .......... | H05K 7/2049 |
| | | | | 361/714 |
| 2006/0199416 A1* | 9/2006 | Tsubaki | .............. | B60R 16/0215 |
| | | | | 439/352 |
| 2008/0142260 A1* | 6/2008 | Yamaguchi | .......... | B60N 2/0224 |
| | | | | 174/72 A |
| 2015/0319880 A1* | 11/2015 | Strickland | ............ | H05K 999/99 |
| | | | | 361/711 |
| 2018/0260003 A1* | 9/2018 | Honma | ................ | G06F 1/1605 |

* cited by examiner

SYSTEM AND METHOD FOR AN UNDER FLOOR SEAT-TO-SEAT WIRING TROUGH TO FACILITATE FLAT FLOORS IN AIRCRAFT PASSENGER CABIN

FIELD

The field of the present disclosure relates generally to seat-to-seat wiring systems in a vehicle and, more specifically, to a system and method that is capable of wiring a plurality of seats of the vehicle under the floor panel of the vehicle.

BACKGROUND

At least some known commercial aircraft include passenger In-Flight Entertainment (IFE) Systems mounted on the back of seats to entertain the passengers during the flight. The IFE Systems are typically wired to a central server located on the aircraft and configured to deliver content to each IFE System. Currently, the IFE Systems are wired using a seat-to-seat wiring system that is installed above the floor panel using raised raceways and seat track covers. While the raised raceways and seat track covers provide access to the seat-to-seat wiring system above the floor panel, they create a raised conduit on the floor panel, or hump on the floor panel, but also creates an uneven walking surface for passengers as they enter their seats. Additionally, the hump may impede galley carts rolling down the aisles. Furthermore, the current seat-to-seat wiring system requires significant installation time because each raceway and seat track cover must be custom cut with a razor blade and custom installed between the seats.

BRIEF DESCRIPTION

In one aspect, a seat-to-seat wiring system for an aircraft is provided. The system includes a floor panel and a wiring trough attached to the floor panel. The wiring trough includes a housing defining a raceway for receiving a wire and a first support member coupled to the housing. The first support member is attached to floor panel for securing the housing to the floor panel. The housing and the wire are disposed below the floor panel.

In another aspect, a wiring trough is provided. The wiring trough includes a housing defining a raceway for receiving a wire and a first support member coupled to the housing. The first support member is attached to the housing for securing the housing to a first structural member. The housing and the wire are positioned below the first structural member.

In yet another aspect, a method of providing wiring beneath a floor panel to a plurality of stations above the floor panel is provided. The method includes positioning a wiring trough below the floor panel such that the wiring trough extends between the plurality of stations. The wiring trough includes a housing defining a raceway for receiving a wire and a support member coupled to the housing. The method also includes coupling the support member to the floor panel. The raceway is configured to route the wire to the plurality of stations below the floor panel.

Although specific features of various examples may be shown in some drawings and not in others, this is for convenience only. Any feature of any drawing may be referenced and/or claimed in combination with any feature of any other drawing.

Unless otherwise indicated, the drawings provided herein are meant to illustrate features of examples of the disclosure. These features are believed to be applicable in a wide variety of systems comprising one or more examples of the disclosure. As such, the drawings are not meant to include all conventional features known by those of ordinary skill in the art to be required for the practice of the examples disclosed herein.

DETAILED DESCRIPTION

The implementations described herein relate to a system and method for routing wires to a plurality of stations. More specifically, the system described herein includes at least one wiring trough positioned below a floor panel of a vehicle (an aircraft). The wiring trough routes at least one wire to a plurality of seats within a passenger cabin. The wires are configured to deliver power and content to an In-Flight Entertainment System coupled to the back of each seat and configured to provide entertainment to the passengers in the passenger cabin. The wiring trough routes the wires below a floor panel within the passenger cabin. As such, the floor panel does not have a hump or raised raceway above floor panel, creating an even, aesthetically pleasing walking surface on the floor panel. Additionally, the wiring trough is attached to the floor panel and a seat track configured to mechanically secure the seats to the floor panel. As such, no additional structural supports are required to install the wiring trough beyond those already present in the current configuration. Moreover, the space under the floor panel was vacant space that was not being used for another purpose. As such, the system described herein creates an even, aesthetically pleasing walking surface without displacing any equipment within the vehicle. Furthermore, a track cover panel is removably positioned over the seat track and wiring trough to provide access to the wiring trough from the passenger cabin. As such, the system described herein creates an even, aesthetically pleasing walking surface while still maintaining access to the system from the passenger cabin.

Figure 1:
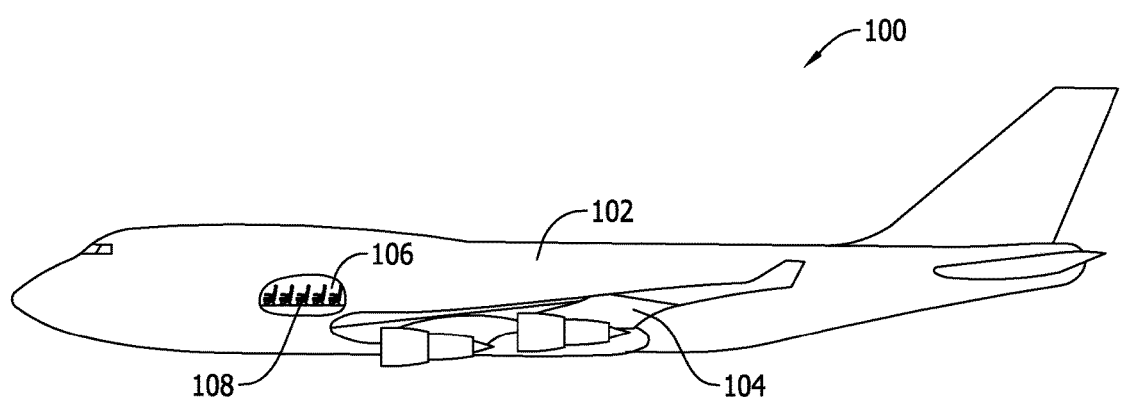
FIG. 1 is a side view illustration of an exemplary vehicle.

FIG. 1 is a side view illustration of a vehicle 100. Vehicle 100 is an aircraft that includes a fuselage 102 and a wing structure 104 extending from fuselage 102. Fuselage 102 defines a passenger cabin 106, and a plurality of passenger seats 108 are positioned within passenger cabin 106. Specifically, vehicle 100 can include a plurality of aisles (not shown) positioned adjacent a plurality of rows (not shown) of passenger seats 108 within passenger cabin 106.

Figure 2:
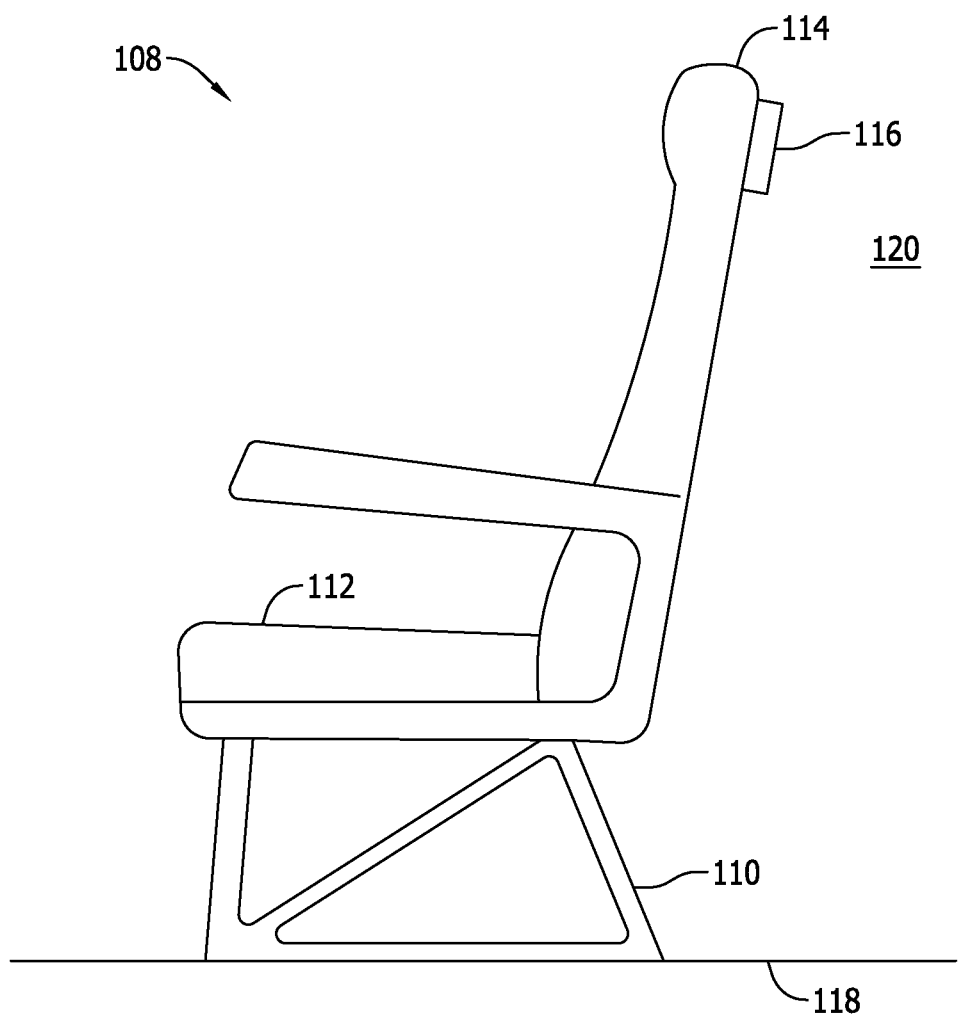
FIG. 2 is a side view illustration of an exemplary passenger seat and floor assembly that may be used in the vehicle shown in FIG. 1.

FIG. 2 is a side view illustration of passenger seat 108 positioned on top of a floor assembly 118. Passenger seat 108 includes a frame 110, a seat bottom 112 coupled to frame 110, and a seat back 114 that is rotatable relative to seat bottom 112. For example, seat back 114 is selectively reclinable for positioning in a fully upright position, a fully reclined position, and intermediate positions therebetween. Seat back 114 has an In-Flight Entertainment (IFE) System or station 116 coupled thereto. IFE system 116 is typically a screen capable of providing entertainment to passengers seated behind passenger seat 108. IFE system 116 can be a touchscreen display capable of allowing passengers to select the type of entertainment IFE system 116 displays. Passenger seat 108 is coupled to, and positioned on top of, floor assembly 118.

Figure 3:
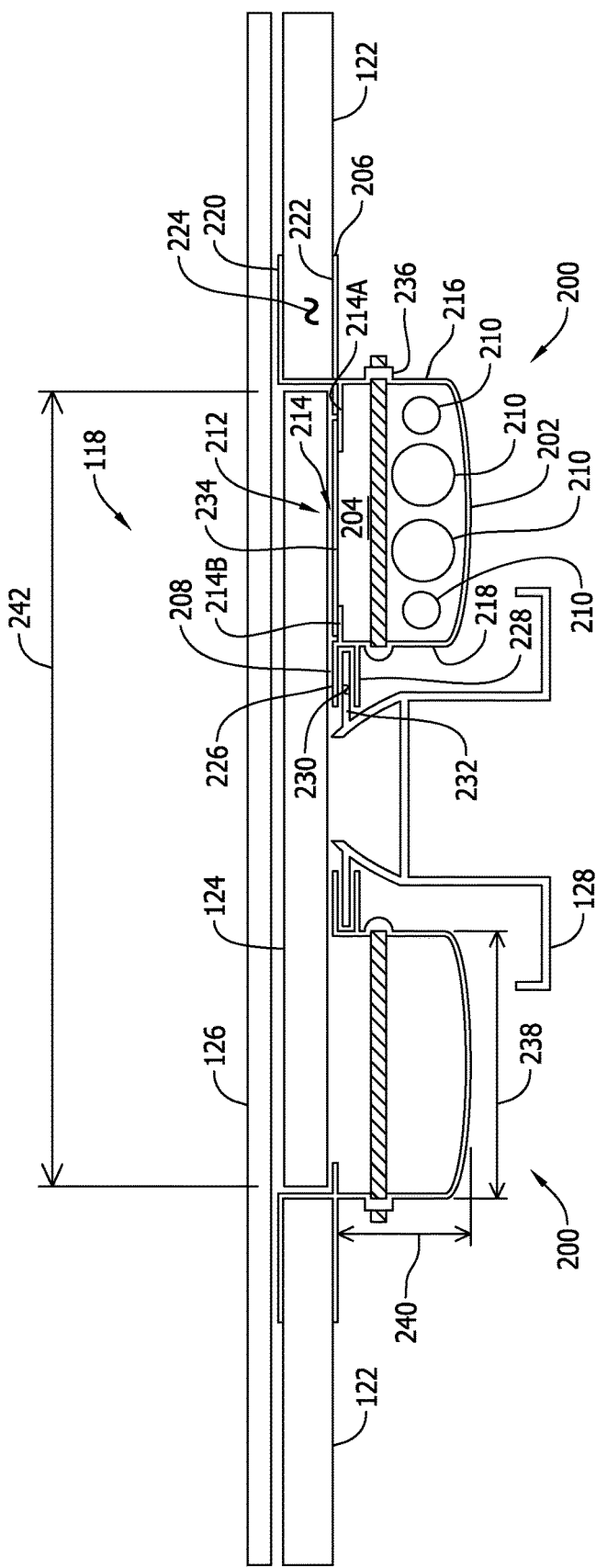
FIG. 3 is a schematic cut away view of an exemplary wiring trough and floor assembly that may be used to wire the passenger seat shown in FIG. 2.

FIG. 3 is a schematic cut away view of an exemplary wiring trough 200 and floor assembly 118 that may be used to wire passenger seat 108 (shown in FIG. 2). Floor assembly 118 includes a floor panel (or first structural member) 122, a track cover panel 124, and a floor covering 126. Floor covering 126 includes carpet and is disposed on floor panel 122 and track cover panel 124. Floor covering 126 may be any finished material applied over floor panel 122 and track cover panel 124 to provide a walking surface that enables reference floor assembly 118 to function as described herein.

A seat track (or second structural member) 128 is positioned below track cover panel 124. Passenger seat 108 is coupled to seat track 128 by a plurality of fasteners (not shown) extending through track cover panel 124, floor panel 122, and/or floor covering 126. Seat track 128 provides structural support for passenger seat 108. Track cover panel 124 is removably positioned over seat track 128 to provide access to seat track 128 from passenger cabin 106. Track cover panel 124 is substantially aligned with floor panel 122 such that floor covering 126 is substantially planar over track cover panel 124 and floor panel 122, providing an even walking surface.

Wiring trough 200 includes a housing 202 defining a raceway 204, a first support member 206, and a second support member 208. Raceway 204 is configured to receive at least one wire(s) 210. Four wires 210 are routed through raceway 204. Any number of wire(s) 210 may be routed through raceway 210 that enables wiring trough 200 to function as described herein. Housing 202 further defines an opening 212 in a top portion 214 of housing 202. Specifically, a first side top portion 214A, positioned on a first side 216 of housing 202, and a second side top portion 214B, positioned on a second side 218 of housing 202, define opening 212. Optionally, an outlet cover 234 is removably positioned above opening 212 and configured to cover opening 212. Outlet cover 234 is supported by first side top portion 214A and second side top portion 214B and defines an outlet cover opening 244 (shown in FIG. 4) through which wire(s) 210 are routed to passenger seats 108. Wire(s) 210 are routed through raceway 204, opening 212, and outlet cover opening 244 to passenger seat 108 (shown in FIG. 2). After installation of wiring trough 200 in vehicle 100, opening 212 provides access to raceway 210 from passenger cabin 106.

First support member 206 is coupled to first side top portion 214A of housing 202 on first side 216 of housing 202. First support member 206 is attached to floor panel 122 such that housing 202 and wire(s) 210 are secured to, and disposed below, floor panel 122. As such, first support member 206 enables wiring trough 200 to route wire(s) 210 below floor panel 122, removing a hump or raised raceway above floor panel 122 and creating an even, aesthetically pleasing walking surface above floor panel 122.

Passengers, carts, seats, luggage, and other equipment are positioned on top of floor panel 122 and may cause floor panel 122 to bend downward. This may, in turn, cause wiring trough 200 to move relative to seat track 128. To prevent movement of wiring trough 200 due to shifting loads on floor panel 122, second support member 208 is attached to seat track 128. Second support member 208 is coupled to top portion 214 of housing 202 on second side 218 of housing 202 opposite first side 216 of housing 202. Second support member 208 provides structural support for wiring trough 200 and maintains a position of wiring trough 200 relative to seat track 128 by securing housing 202 to seat track 128.

First support member 206 includes a first arm 220 and a second arm 222 spaced from first arm 220 and substantially parallel to first arm 220. First arm 220 and second arm 222 define a gap 224 configured to receive floor panel 122 therein. Similarly, second support member 208 includes a first arm 226 and a second arm 228 spaced from first arm 226 and substantially parallel to first arm 226. First arm 226 and second arm 228 define a gap 230 configured to receive a first flange 232 of seat track 128 therein. First support member 206 may include any structure that enables first support member 206 to attach housing 202 to floor panel 122. Second support member 208 may include any structure that enable second support member 208 to attach housing 202 to seat track 128.

First support member 206 may include only first arm 220 or only second arm 222. Similarly, second support member 208 may include only first arm 226 or only second arm 228. Removing one of the arms 220, 222, 226, and 228 from first support member 206 and second support member 208 reduces the weight of wring trough 200 and vehicle 100.

Optionally, outlet cover 234 is removably positioned above opening 212 and configured to cover opening 212. Outlet cover 234 provides additional structural support for housing 202 and prevents debris and dust from settling in raceway 210. As passengers, carts, luggage, and other equipment pass over floor covering 126, floor panel 122, and track cover panel 124, track cover panel 124 may shift under the shifting loads. This slight movement may allow dust and debris to settle in raceway 204. Outlet cover 234 prevents dust and debris from entering raceway 204 through opening 212.

Optionally, a plurality of strength rods 236 extend through first side 216 and second side 218 of housing 202 and through raceway 204. Strength rods 236 provide additional structural support for housing 202. Strength rods 236 include bolts configured to maintain the positions of first side 216 and second side 218 of housing 202 relative to each other. Strength rods 236 may be any structural support that provides additional structural support to housing 202. As shown in FIG. 3, wire(s) 210 are routed below strength rods 236 within raceway 204. Wire(s) 210 may be routed above strength rods 236 within raceway 204. Some wire(s) 210 may be routed below strength rods 236 within raceway 204 and some wire(s) 210 may be routed above strength rods 236 within raceway 204.

Housing 202 has a housing width 238 and a housing height 240. Housing width 238 is about 3 inches to about 5 inches and housing height is about 1 inch to about 1.5 inches. Track cover panel 124 has a track cover panel width 242 that is about 8 inches to about 12 inches.

Figure 4:
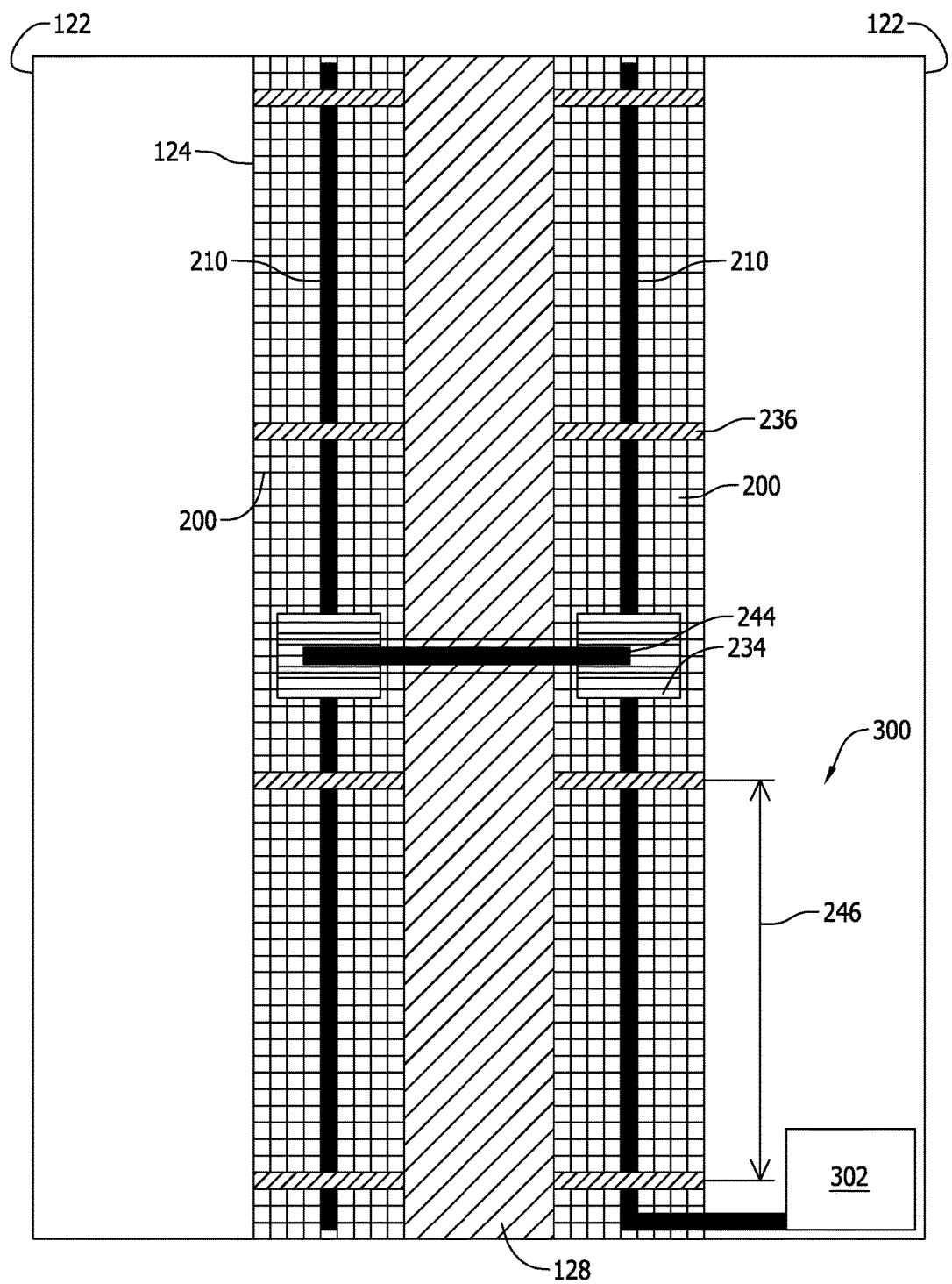
FIG. 4 is a top view of a passenger cabin that may be used in the vehicle shown in FIG. 1.

FIG. 4 is a top view of a portion of passenger cabin 106 without passenger seats 108 illustrating floor assembly 118 that may be used in vehicle 100 (shown in FIG. 1). Track cover panel 124 is illustrated as transparent in FIG. 4 to provide a view of seat track 128, wiring troughs 200, and wire(s) 210. As shown, track cover panel 124, seat track 128, wiring troughs 200, and wire(s) 210 extend parallel to floor panels 122. Removing track cover panel 124 provides access to wiring troughs 200 and seat track 128. Removing optional outlet covers 234 provides access to raceway 204 and wire(s) 210. As shown, outlet covers 234 include an outlet cover opening 244 through which wire(s) 210 are routed to passenger seats 108. Floor covering 126 (not shown in FIG. 4) includes a plurality of openings through which wire(s) 210 are routed to passenger seats 108. Optional strength rods 236 are spaced a predetermined distance 246 from each other. Predetermined distance 246 is about 1 foot to about 4 feet. Predetermined distance 246 is about 2 feet to about 3 feet. Locating strength rods 236 at approximately every 1 to 4 feet provides additional structural support to housing 202 without adding significant weight to vehicle 100. The plurality of rows (not shown) of passenger seats 108 can be positioned on top of floor assembly 118 and centered over seat track cover panel 124. The plurality of aisles (not shown) can be positioned adjacent the plurality of rows (not shown) of passenger seats 108 over floor panel 122. The presence and/or location of strength rods 236 can be determined by the position of the plurality of rows (not shown) of passenger seats 108 and/or the plurality of aisles (not shown) over floor panel 122.

As shown in FIG. 4, a seat-to-seat wiring system 300 includes floor assembly 118 and at least one wiring trough 200. Seat-to-seat wring system 300 is configured to route wire(s) 210 to a plurality of passenger seats 108 within passenger cabin 106. Seat-to-seat wiring system 300 includes two wiring troughs 200 positioned on opposite sides of seat track 128 and each configured to route wires to a plurality of passenger seats 108. Seat-to-seat wiring system 300 may include any number of wiring troughs 200 that enable seat-to-seat wiring system 300 to operate as described herein, including one wiring trough 200 positioned on one side of seat track 128. Seat-to-seat wiring system 300 also includes a central server 302 coupled to wire(s) 210 and configured to store and/or receive IFE content thereon. Central server 302 can also receive communications from IFE system 116. Specifically, a passenger can select a type of entertainment on IFE system 116 and the selection is transmitted to central server 302. Central server 302 then transmits the selected entertainment back to IFE system 116. As used herein, IFE content includes movies, episodes of TV series, games, applications, computer programs, safety instructions, general instructions, advertisements, and/or any form of entertainment or information configured to be shown on an IFE system.

Figure 5:
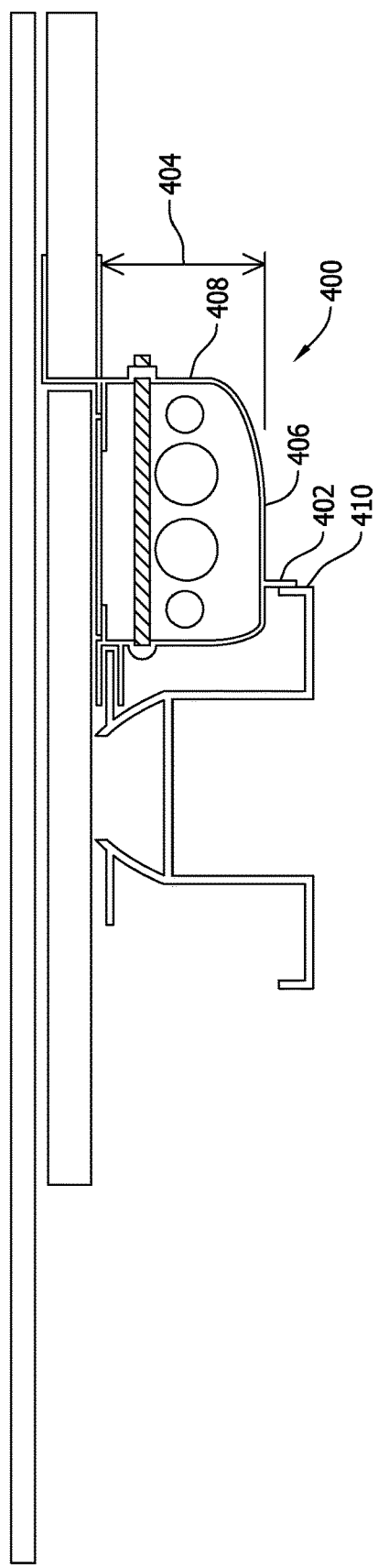
FIG. 5 is a schematic cut away view of another exemplary wiring trough and floor assembly that may be used to wire the passenger seat shown in FIG. 2.

FIG. 5 is a schematic cut away view of another exemplary wiring trough 400 and floor assembly 118 that may be used to wire passenger seat 108 (shown in FIG. 2). Wiring trough 400 is substantially similar to wiring trough 200 except that wiring trough 400 includes a support flange 402 and has a housing height 404 that is greater than housing height 240. Support flange 402 is coupled to, and extends from, a bottom portion 406 of a housing 408. Support flange 402 is attached to a second flange 410 of seat track 128 and provides additional structural support for housing 408. Specifically, support flange 402 is attached to second flange 410 by a fastener (not shown) extending through support flange 402 and/or second flange 410. Support flange 402 provides additional torsional structural support to prevent housing 408 from twisting due to shifting loads on floor panel 122, track cover panel 124, and seat track 128. In order to position support flange 402 proximate second flange 410, housing 408 is extended downward toward second flange 410 such that housing height 404 is greater than housing height 240 (shown in FIG. 3). Specifically, housing height 404 is about 1.5 inches to about 3 inches in order to provide proper positioning and orientation within existing seat tracks 128.

Figure 6:
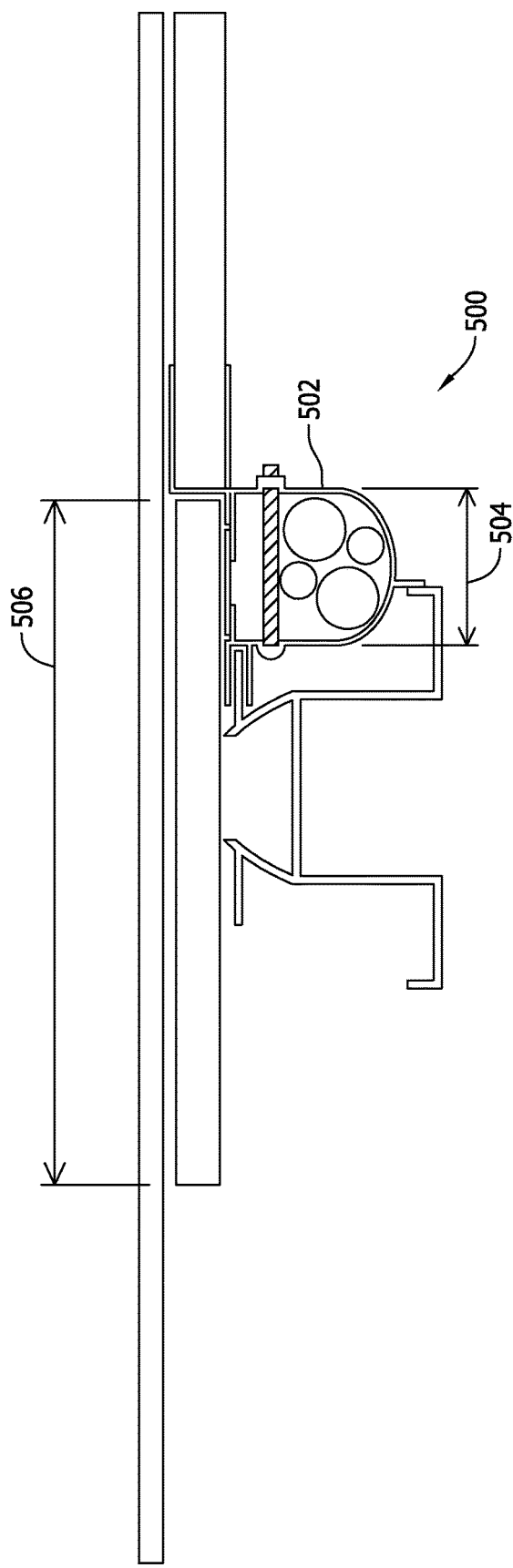
FIG. 6 is a schematic cut away view of yet another exemplary wiring trough and floor assembly that may be used to wire the passenger seat shown in FIG. 2.

FIG. 6 is a schematic cut away view of another exemplary wiring trough 500 and floor assembly 118 that may be used to wire passenger seat 108 (shown in FIG. 2). Wiring trough 500 is substantially similar to wiring trough 400 except that wiring trough 500 includes a housing 502 that is narrower than housing 408 such that housing 502 has a housing width 504 that is less than housing width 238. Specifically, housing width 504 is about 1.5 inches to about 3 inches. Reducing housing width 504 reduces the amount of material within wiring trough 500 thereby reducing the weight of vehicle 100. Furthermore, reducing housing width 504 also reduces the overall width of seat-to-seat wiring system 300 such that a track cover panel width 506 is also reduced. The reduced housing width 504 and cover panel width 506 reduces the weight of seat-to-seat wiring system 300 while allowing seat-to-seat wiring system 300 to support wire(s) 210. Specifically, track cover panel width 506 is about 5 inches to about 8 inches.

In addition to the above-examples or alternatively, wiring troughs 200, 400, and 500 can include any combination of first support member 206, second support member 208, and support flange 402 that enables wiring troughs 200, 400, and 500 to operate as described herein. For example, wiring troughs 200, 400, and 500 can include only second support member 208 and support flange 402 such that wiring troughs 200, 400, and 500 are coupled only to seat track 128. Wiring troughs 200, 400, and 500 may include only first support member 206 and support flange 402.

Figure 7:
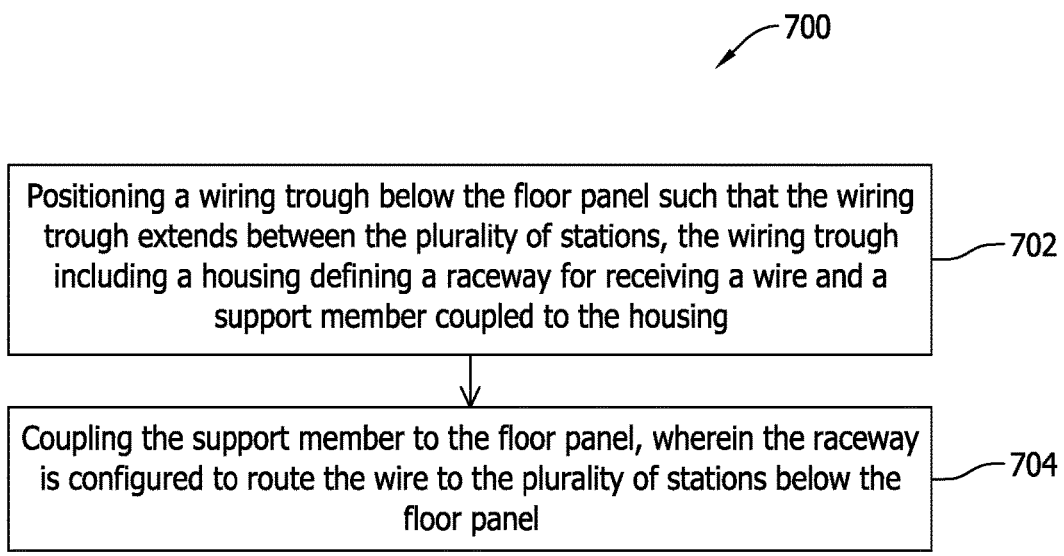
FIG. 7 illustrates a flow chart of a method of providing In-Flight Entertainment content using the wiring trough shown in FIG. 3.

FIG. 7 illustrates a flow chart of a method 700 of providing wiring 210 beneath floor panel 122 to plurality of stations 116 above floor panel 122 shown in FIGS. 2, 3, and 4. Method 700 includes positioning wiring trough 200 below floor panel 122 such that wiring trough 200 extends between plurality of stations 116. Wiring trough 200 includes housing 202 defining raceway 204 for receiving wire(s) 210 and support member 206 coupled to housing 202. Method 700 also includes coupling support member 206 to floor panel 122. Raceway 204 is configured to route wire(s) 210 to plurality of stations 116 below floor panel 122. Method 700 further includes delivering content to plurality of stations 116 through wire(s) 210.

Wiring troughs 200, 400, and 500 described herein may be used in any vehicle or build where underfloor wiring is advantageous. For example, vehicle 100 may also include buses, trains, cars, boats, or any other vehicular device where wiring a plurality of stations under a floor panel is advantageous. Additionally, wiring troughs 200, 400, and 500 described herein may be used in any building where wiring a plurality of stations under a floor panel is advantageous. For example, wiring troughs 200, 400, and 500 may be used in theaters, office buildings, or warehouses.

Some examples involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above are examples only, and thus are not intended to limit in any way the definition or meaning of the terms processor, processing device, and related terms.

In the examples described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the examples described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the examples described herein, additional output channels may include, but not be limited to, an operator interface monitor.

The systems and methods described herein are not limited to the specific examples described herein, but rather, components of the systems and/or steps of the methods may be utilized independently and separately from other components and/or steps described herein.

Although specific features of various examples of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one example" of the present disclosure or "an example" are not intended to be interpreted as excluding the existence of additional examples that also incorporate the recited features.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A seat-to-seat wiring system for an aircraft, the system comprising:
    a floor panel;
    a seat track; and
    a wiring trough attached to the floor panel and the seat track, the wiring trough including:
        a housing defining a raceway for receiving a wire;
        a first support member coupled to the housing, the first support member attached to the floor panel for securing the housing to the floor panel, wherein the housing and the wire are disposed below the floor panel; and
        a second support member coupled to the housing and attached to the seat track for securing the housing to the seat track.

2. The seat-to-seat wiring system of claim 1, wherein the wiring trough includes a support flange coupled to the housing and attached to the seat track for securing the housing to the seat track.

3. The seat-to-seat wiring system of claim 2, wherein the support flange extends from a bottom portion of the housing.

4. The seat-to-seat wiring system of claim 1, wherein the second support member includes a first arm and a substantially parallel second arm spaced from the first arm to define a gap therebetween, wherein a flange of the seat track is at least partially disposed in the gap.

5. The seat-to-seat wiring system of claim 1, wherein the first support member extends from a first side of the wiring trough, and wherein the second support member extends from an opposing second side of the wiring trough.

6. The seat-to-seat wiring system of claim 1, further comprising a track cover panel removably disposed above the seat track and the wiring trough to provide access to the wiring trough.

7. The seat-to-seat wiring system of claim 6, wherein the track cover panel is substantially aligned with the floor panel such that a floor covering extends over the floor panel and the track cover panel.

8. The seat-to-seat wiring system of claim 1, further comprising a plurality of seats disposed over the floor panel, the wiring trough configured to route the wire to the plurality of seats.

9. The seat-to-seat wiring system of claim 1, wherein the first support member includes a first arm and a substantially parallel second arm spaced from the first arm to define a gap therebetween, wherein the floor panel is at least partially disposed in the gap.

10. The seat-to-seat wiring system of claim 1, wherein a floor covering is disposed on the floor panel.

11. The seat-to-seat wiring system of claim 10, wherein the floor covering is substantially planar above the wiring trough.

12. A wiring trough comprising:
- a housing defining a raceway for receiving a wire;
- a first support member coupled to the housing, the first support member attached to the housing for securing the housing to a first structural member, wherein the housing and the wire are positioned below the first structural member; and
- a strength rod coupled to the housing and configured to provide structural support for the housing, wherein the wire is routed below the strength rod within the raceway.

13. The wiring trough of claim 12, wherein the housing defines an opening in a top portion of the housing, the wire configured to be routed through the opening.

14. The wiring trough of claim 13, further comprising an outlet cover plate configured to cover the opening.

15. The wiring trough of claim 12, further comprising a second support member coupled to the housing, the second support member attached to the housing for securing the housing to a second structural member.

16. The wiring trough of claim 15, further comprising a support flange extending from a bottom portion of the housing, the support flange attached to the housing for securing the housing to the second structural member.

17. The wiring trough of claim 12, wherein the first support member comprises a first arm, a second arm, and a gap defined therebetween, the gap configured to receive the first structural member therein to attach the housing to the first structural member.

18. A method of providing wiring beneath a floor panel to a plurality of stations above the floor panel, the method comprising:
- positioning a wiring trough below the floor panel such that the wiring trough extends between the plurality of stations, the wiring trough including a housing defining a raceway for receiving a wire and a support member coupled to the housing; and
- coupling the support member to the floor panel, wherein the raceway is configured to route the wire to the plurality of stations below the floor panel.

19. The method of claim 18, further comprising delivering content to plurality of stations through the wire.

* * * * *